No. 756,278. PATENTED APR. 5, 1904.
D. PHRONIMOS.
WIND MOTOR.
APPLICATION FILED DEC. 26, 1903.
NO MODEL. 2 SHEETS—SHEET 1.

Witnesses:
Chas. J. O'Neill
E. C. Schuermann

Inventor:
Demosthenes Phronimos,
by Lemure & Goldsborough
Attys.

No. 756,278. PATENTED APR. 5, 1904.
D. PHRONIMOS.
WIND MOTOR.
APPLICATION FILED DEC. 26, 1903.
NO MODEL. 2 SHEETS—SHEET 2.

Witnesses:
Chas. J. O'Neill
E. C. Schuermann

Inventor:
Demosthenes Phronimos,
by Lemmie & Goldsborough,
Attys

No. 756,278. Patented April 5, 1904.

UNITED STATES PATENT OFFICE.

DEMOSTHENES PHRONIMOS, OF WASHINGTON, DISTRICT OF COLUMBIA.

WIND-MOTOR.

SPECIFICATION forming part of Letters Patent No. 756,278, dated April 5, 1904.

Application filed December 26, 1903. Serial No. 186,638. (No model.)

*To all whom it may concern:*

Be it known that I, DEMOSTHENES PHRONIMOS, a subject of the King of Greece, residing in the city of Washington, District of Columbia, have invented certain new and useful Improvements in Wind-Motors; and I do hereby declare the following to be a full, clear, and exact description of the invention, such as will enable others skilled in the art to which it appertains to make and use the same.

My invention has for its object the production of a wind-motor of such construction that, first, its speed of revolution is within the ready control of the operator however great the velocity of the wind momentarily prevailing; that, second, the speed of revolution of the wind-wheel shall be under the control of an automatic regulator, so that it shall not exceed a predetermined maximum whatever fluctuations there may be in the wind-supply; that, third, the wind-wheel itself instead of being hung in the open air from the top of a hill-tower and exposed directly to the violence of storms shall be located within an inclosed structure and its shaft mounted in secure bearings borne upon a solid foundation; that, fourth, the structure receiving the impact of the wind and supplying it to the wheel is of such design as to admit the wind from whatever quarter it may blow and is automatically protected against excess of internal pressure by an ample series of relief doors or valves; that, fifth, the weight of the wind-wheel and its shaft being borne directly by the solid foundation instead of by the structure referred to the said structure may with safety and economy be made correspondingly light, inasmuch as it has to support merely its own burden and relatively light transmitting-shafting.

In the accompanying drawings, illustrative of my invention, I have shown the form in which I prefer to embody it, although it will be understood that the characteristic features of construction hereinafter described and claimed are capable of embodiment in other forms or modifications than the one shown.

Figure 1:
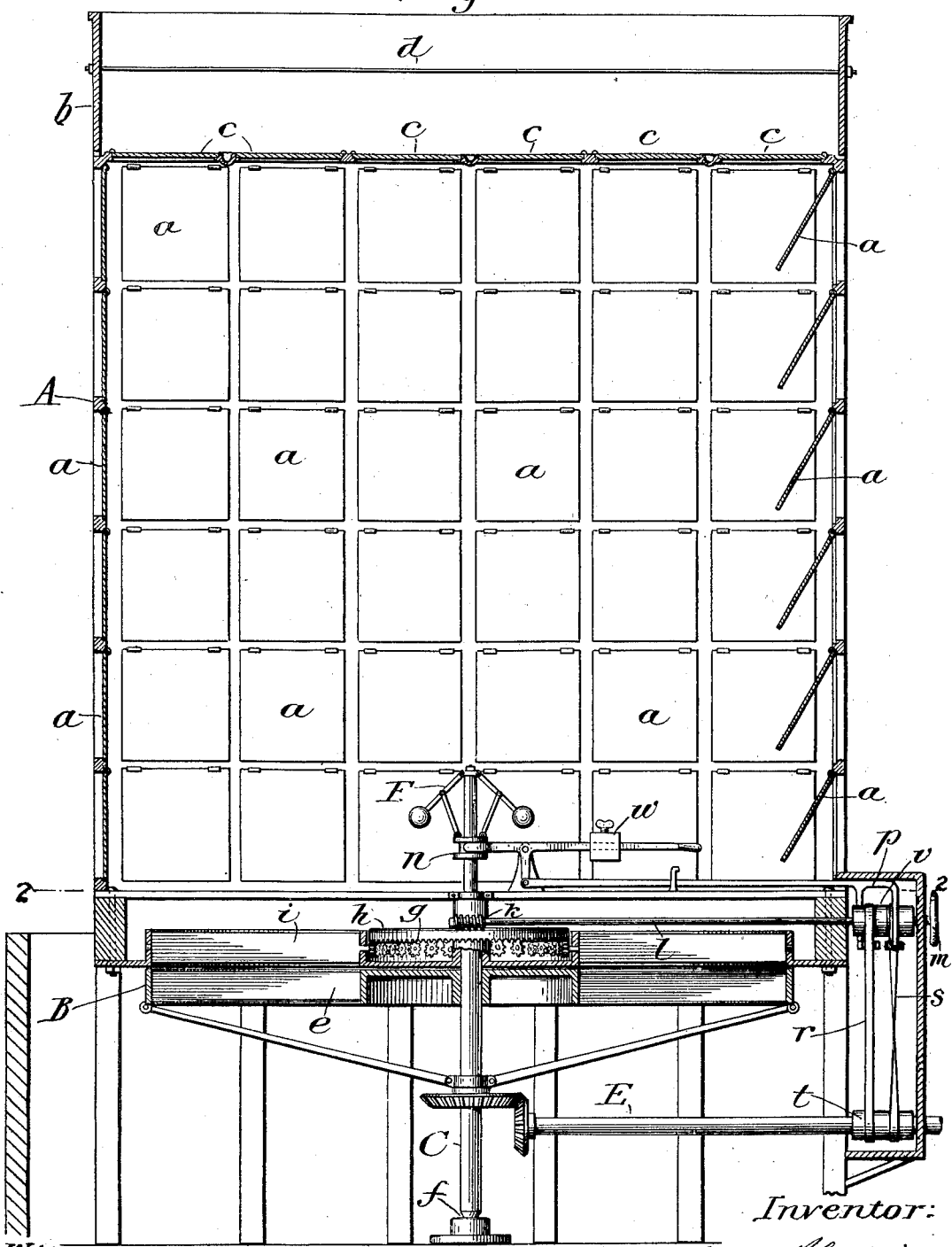
Figure 2:
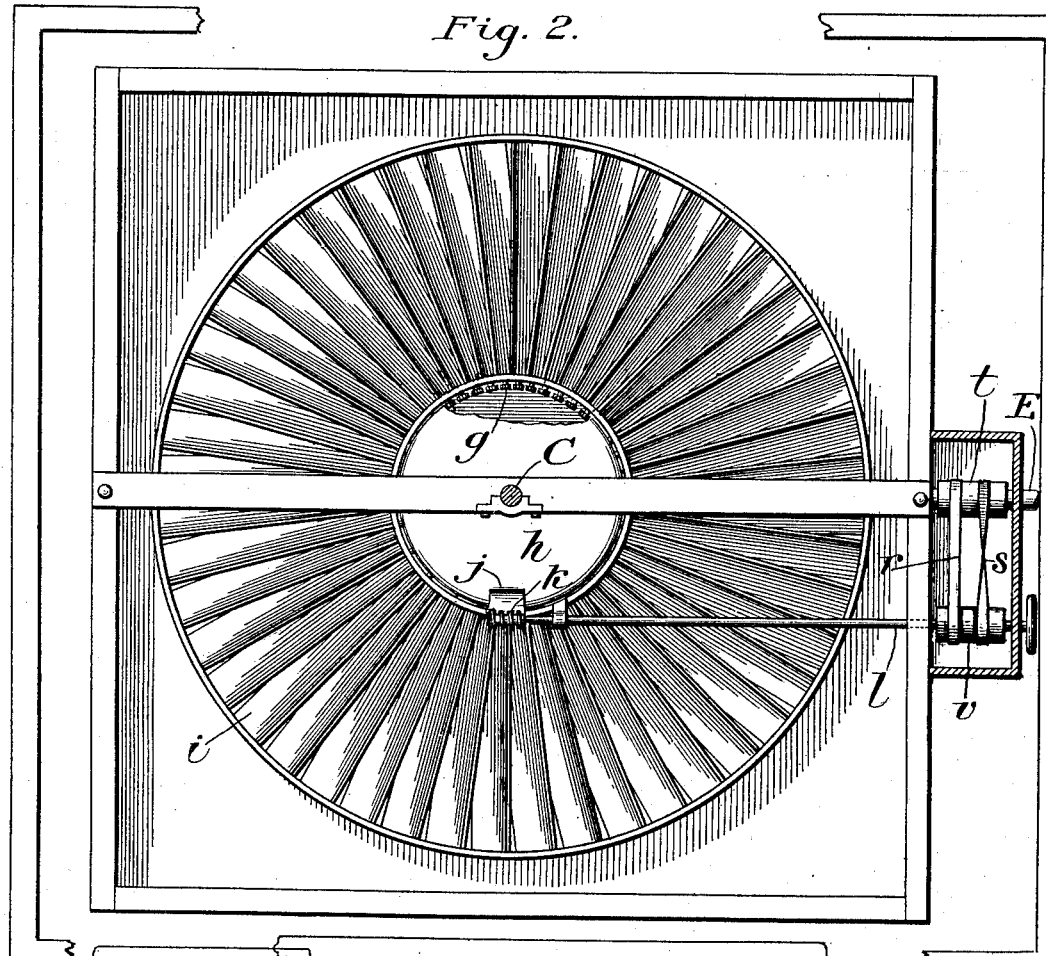
Figure 6:
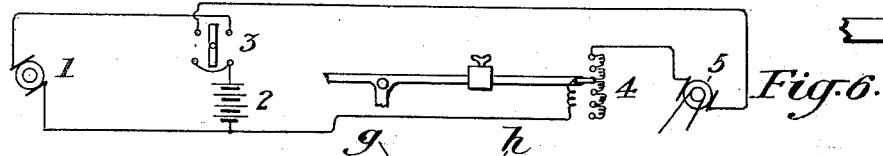
Figure 4:
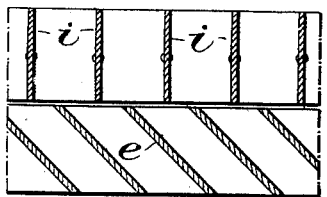
Figure 3:
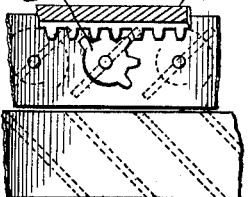
Figure 5:
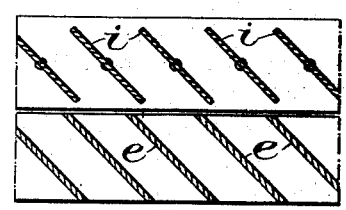

Figure 1 represents a central vertical section, partly in elevation, of the said wind-motor embodying my invention. Fig. 2 represents a partial plan view and section. Figs. 3, 4, and 5 represent in section several adjustments of the series of governing-vanes regulating the direction which the blasts from the receiving structure take with respect to the fixed blades of the wind-wheel. Fig. 6 is a conventional illustration of the auxiliary electromotor-circuit controlled by the speed-governor.

Similar characters of reference indicate similar parts throughout the several views.

Referring to the drawings, A indicates an edifice or structure erected upon suitable pillars, as shown, and supported by a firm foundation. This edifice is provided round about its entire periphery with a series of openings provided with inwardly-opening flap-doors or hanging valves $a$, which are supported to swing freely from suspension-hinges, as indicated. The top or roof of the structure is provided over its entire extent with upwardly and outwardly swinging flap-doors or relief-valves $c$, which are adapted to open if the air-pressure within the edifice becomes so great as to endanger its safety. Above the top or roof portion of the edifice extends a parapet $b$, whose function is to shield the relief-valves $c$ from the wind, which might otherwise tend to hold them closed and partially defeat their purpose. Transverse rods, as $d$, serve to brace the structure at its upper portion and also act as stops to the upwardly-opening relief-valves should the latter tend to turn completely over upon their hinges.

The wind-wheel B is provided with a series of radial stationary blades $e$, set at a suitable angle, and is mounted upon the upright shaft C, which is supported independently of the edifice A in a step-bearing $f$ in such manner that the weight of the wheel and its shaft is borne directly by the foundations, so that the edifice itself has merely its own weight to carry and can therefore be made correspondingly light. The shaft C may conveniently be geared, as shown, to a transmission-shaft E for driving any suitable mill machinery or the like.

The location of the wind-wheel B in a horizontal plane and out of direct exposure to the outer atmosphere and at the bottom of the edifice and upon an independently-supported shaft insures great stability for the wind-motor as a whole, the edifice being practically relieved from the weight of the wheel and its shaft and the wheel being thus protected from the violence of the elements, while the edifice itself is protected against damage or destruction by the relief-valves provided for that purpose.

Immediately above the wind-wheel is located a series of movable vanes or blades $i$, corresponding to the blades of the wind-wheel. These vanes are mounted to rock upon bearing-pins or gudgeons and are provided for that purpose with small gears $g$ at their inner ends, which gears engage with a shiftable plate $h$, having a toothed rim, as indicated. The plate $h$ carries a projection $j$, having a series of teeth which engage with a worm $k$ upon a shaft $l$. This shaft $l$ is provided at its outer end with a hand-wheel $m$, so that by turning the hand-wheel the inclination of the vanes $i$ can be altered, as indicated in Figs. 3, 4, and 5. Thus when the vanes are in the adjustment indicated in Fig. 5 the wind-wheel will come to rest, for the reason that the blasts of air from the edifice will pass directly through the space between the blades of the wind-wheel without exerting any propelling force thereon. When the vanes are in the adjustment indicated in Fig. 3, however, the full force of the blasts from the edifice will be directed upon the blades of the wind-wheel, so that the wind-wheel will reach its highest velocity. When the vanes are in the vertical adjustment indicated in Fig. 4, the wind-wheel will rotate at a slower speed, for the reason that the impact of the blast upon the blades is not so direct as in Fig. 3, and it will be evident that by adjusting the vanes to intermediate positions various intermediate speeds of revolution may be attained.

The wind-wheel shaft C may be provided with a centrifugal ball-governor F, adapted to raise or lower the sleeve $n$ in accordance with the speed developed by the shaft. The sleeve is connected by a series of levers, as shown, to a belt-shifter $p$, the yoke of said belt-shifter engaging the belts $r$ and $s$, one of which is crossed and which connects the pulley $t$ of the transmission-shaft E with idler-pulleys upon the rod $l$, said rod being also provided with a fixed pulley $v$ intermediate of the idler-pulleys. A counterweight $w$ may be set at any predetermined point upon its lever, so as to determine the conditions under which the centrifugal governor will act upon the belt-shifting device. It will be understood, therefore, that should the wind-wheel attain a dangerous velocity or a velocity higher than has been predetermined the centrifugal governor will act to shift one of the belts to the fixed pulley upon the rod $l$ and will thereby shift the vanes so as to cut down the speed of the wind-wheel, whereas, on the other hand, should the speed of the wind-wheel, in consequence of a diminution in the force of the blast, tend to drop, the centrifugal governor will permit the belt-shifter to shift the other belt to said pulley, thereby adjusting the vanes to supply the blasts of air more directly to the blades of the wind-wheel, thereby maintaining its speed. It is also feasible, by lengthening the lever upon which the counterweight is mounted, to automatically actuate a rheostat contained in an electric circuit of an electric motor, so that a greater or less amount of current may be admitted to said electric motor from an accumulator or secondary battery supplied from a dynamo-machine, as illustrated in Fig. 6, in which the numeral 1 indicates the dynamo, 2 the secondary battery, adapted to be connected with the dynamo or with the motor 5 by way of switch 3, and a rheostat 4, more or less of the resistance of which is included in the circuit of the battery and motor as the speed of the wind-wheel varies. In this manner when the wind-currents are weak the factory may be automatically supplied with electric power in proportion to the diminution in power supplied from the wind-motor.

In order to prevent the wind from exercising a counter-pressure upon the wind-wheel and to permit the blasts of air from the edifice to pass freely through the wheel after they have exercised their driving power upon it, the lower part of the structure should be protected from the wind either by the buildings which naturally would surround the edifice or by a wall of about the height of the supporting-pillars and completely encircling the same at an intermediate distance sufficient to permit free passage of the air.

The operation of the apparatus will be apparent from the foregoing description. From whatever quarter the wind may blow the flap-valves on that side of the edifice will open to admit the wind, and the flap-valves on the other quarters will close, thereby constituting the edifice a reservoir for the supply of air under pressure through the vanes to the wind-wheel. Should this pressure become excessive, it will be relieved by the upwardly-opening valves in the roof of the structure, and according as the vanes are set the speed of the windmill will vary from rest up to the maximum output.

Having thus described my invention, what I claim is—

1. A wind-motor, comprising a wind-wheel, and an edifice receiving the wind and transmitting it to the wheel, said edifice being provided with inwardly-opening self-closing hanging flap doors or valves around its periphery; substantially as described.

2. A wind-motor, comprising a wind-wheel, and an edifice receiving the wind and transmitting it to the wheel, said edifice being provided with inwardly-opening flap doors or valves around its periphery, and having outwardly-opening relief doors or valves in its top; substantially as described.

3. A wind-motor, comprising an upright shaft carrying a wind-wheel and mounted upon a solid foundation, and an edifice surmounting the wheel and serving as a chamber for the wind and supplying it to the wheel, valved wind-inlet openings into said edifice above the wheel and a wind-outlet below the wheel; substantially as described.

4. A wind-motor, comprising a wind-wheel having a series of inclined blades with intervening openings, an edifice receiving the wind and transmitting it to the wheel, a series of vanes immediately adjacent to the wind-wheel for governing the direction taken by the wind in passing from the edifice through the wheel-openings, and means for changing the adjustment of the vanes to regulate the speed of the wheel or to stop it; substantially as described.

5. A wind-motor, comprising a wind-wheel having a series of inclined blades with intervening openings, an edifice receiving the wind and transmitting it to the wheel, a series of vanes immediately adjacent to the wheel for governing the direction taken by the wind in passing from the edifice through the wheel-openings, means for changing the adjustment of the vanes, and a governor for automatically regulating said change of adjustment; substantially as described.

6. A wind-motor, comprising a wind-wheel mounted upon a vertical shaft to rotate in a horizontal plane, a horizontal series of vanes corresponding to the wheel and above the same, and a superjacent wind-receiving edifice, the said edifice being supported from the foundation independently of the wheel and wheel-shaft; substantially as described.

7. In a wind-motor of the kind described, a wind receiving and transmitting edifice, having a series of inwardly-opening flap doors or valves round about its periphery, a series of outwardly-opening flap doors or valves in its top, and a parapet surrounding the top and protecting the top doors or valves from the wind; substantially as described.

8. A wind-motor, comprising a wind-wheel having a series of inclined blades with intervening openings, an edifice receiving the wind and transmitting it to the wheel, vanes immediately adjacent to the wheel for determining the direction taken by the wind in passing through the wheel-openings, and a centrifugal governor for shifting said vanes; substantially as described.

In testimony whereof I affix my signature in presence of two witnesses.

DEMOSTHENES PHRONIMOS.

Witnesses:
JOHN C. PENNIE,
W. P. HALLE WILLIAMS.